United States Patent [19]

Slevinsky

[11] Patent Number: 5,787,050
[45] Date of Patent: Jul. 28, 1998

[54] WELL TEST IMAGING

[75] Inventor: Bruce A. Slevinsky, Calgary, Canada

[73] Assignee: Petro-Canada, Calgary, Canada

[21] Appl. No.: 689,791

[22] Filed: Aug. 13, 1996

[51] Int. Cl.$^6$ .................. G01V 1/40; F21B 49/00
[52] U.S. Cl. .................. 367/25; 364/422; 175/50; 166/113; 166/250
[58] Field of Search .................. 367/25; 364/422; 175/48, 50; 166/113, 250

[56] References Cited

U.S. PATENT DOCUMENTS

| | | | |
|---|---|---|---|
| 4,607,524 | 8/1986 | Grengaster | 73/152 |
| 4,799,157 | 1/1989 | Kueuli et al. | 364/422 |
| 5,431,227 | 7/1995 | Montgomery | 166/307 |

FOREIGN PATENT DOCUMENTS

| | | |
|---|---|---|
| 2128481 | 3/1995 | Canada . |
| 2281971 | 3/1995 | United Kingdom . |

OTHER PUBLICATIONS

Ehhg-Economides, J. Petrol. Tech., vol. 40, #10, pp. 1280–1282, Oct. 1988.
Earlougher, Robert C., Jr. "Advances in Well Test Analysis", Soc. of Pet. Eng. of AIME, 1977, Dallas, Ch. 2, pp. 4–8, Ch. 3, pp. 22–23 Ch. 6, pp. 45–49 Appendix E. pp. 242–245.
Larsen, L., Seal Oil Gas Reservoir Sem., Dec. 2, 1985, pp. 257–268.
Larsen, L., 58th Ann. SPE of AIME, Oct. 5, 1983, Abstract only.

*Primary Examiner*—Nelson Moskowitz
*Attorney, Agent, or Firm*—Millen, White, Zelano, & Branigan, P.C.

[57] ABSTRACT

An improved method is provided for establishing the location and orientation of the boundaries surrounding a reservoir and creating an image thereof. A conventional well test is performed on a well, establishing measures of the well's pressure response as a function of the rate of pressure change in the reservoir over time. Conventional techniques may be used to determine measures of the radius of investigation. A plurality of radii of investigation are determined as a function of time. A calculated response for an infinite and radially extending well are the measured response are compared as a ratio. Variation of the ratio from unity is indicative of the presence of a boundary at that radius of investigation and the magnitude of its effect related to an angle-of-view. Each radius of investigation is deemed analogous to a ring. Reservoir encompassed by this ring is in communication with the well. This ring is interrupted along its circumference by an encounter with a boundary or boundaries, the arc length of such an interruption being equal to the angle-of-view. The remaining arc of the ring is rotated so that at least one of the arc's end-points coincides, or is fitted, with a known geologic feature. Should the same ring arc intersect another feature, the ring arc is cut to form a new arc end-point. The remaining arc is rotated so that its new end-point again coincides with a geologic feature. Once all the ring arcs for each radius of investigation are fitted, their collective end-points form an image of the periphery of the reservoir.

2 Claims, 13 Drawing Sheets

WELL TEST IMAGING

This application is related to pending U.S. application Ser. No. 08/124,054, filed Sep. 17, 1993 now U.S. Pat. No. 5,548,563.

FIELD OF THE INVENTION

The present invention relates to an improved method for determining the location and orientation of reservoir boundaries from conventional well test data. More particularly, the invention refines the determination of an image of the reservoir boundary by individually rotating the boundary information determined for each radius of investigation, and fitting it with known geologic features, the angle-of-view information being rotated about the well.

BACKGROUND OF THE INVENTION

The present invention relates to improved methodology of well test imaging disclosed in co-pending U.S. application Ser. No. 08/124,054, filed Sep. 17, 1993 and now U.S. Pat. No. 5,548,563 by Slevinsky. The present application incorporates by reference the description of the co-pending application.

The invention provides a refined method for matching angle-of-view and radius of investigation information to known geologic features for more precisely defining the reservoir boundary. For convenience, a brief description of the concept of angle-of-view is summarized herein.

A conventional well test is performed on a well, establishing measures of the well's pressure response as a function of the rate of pressure change in the reservoir over time. Conventional techniques are used to determine measures of the radius of investigation. The calculated response for an infinite and radially extending well and the measured response are compared as a ratio. Variation of the ratio from unity is indicative of the presence of a boundary and its magnitude is related to an angle-of-view. The angle-of-view is related to the extent of the effect of the boundary on the well.

As determination of the exact orientation of the boundary is indeterminate, the image formed is a result of the application of one of several assumed models; the Angular Image Model, the Balanced Image Model or the Channel-Form Image Model. The appropriate model to apply is that which produces the best fit with known geologic features, determined by seismic or other data. More particularly, an angle-of-view is calculated for each radius of investigation. By combining the angle-of-view and the radius of investigation, one can define vectors which extend from the well to locations on a boundary. The boundary information determined at each successive radius of investigation is related to previous boundary information according to the criteria defined by the model. All boundary information is combined to form an image of the reservoir boundary. The model's image which is most representative of the reservoir is chosen, based upon a comparison of angle-of-view values, known geologic data and/or images from other proximally located wells.

Application of the method disclosed in the co-pending application sometimes results in less than a satisfactory match with known geologic data. Note that the entire image was formed according to a model and then aligned to fit best with the geologic information. Unfortunately, while each angle-of-view is representative of the effect of the boundary at that radius of investigation, it did not necessarily convey the information necessary to properly orient each angle-of-view with respect to each other angle-of-view.

SUMMARY OF THE INVENTION

In accordance with the invention, an improved well test imaging method is provided for relating transient pressure response data of a well test to its reservoir boundaries.

The improvement stems from an understanding that the angle-of-view information determined for each radius of investigation is distinct from all others and may be individually rotated for a more precise orientation with known geologic features.

In one broad aspect then, the invention is a method for creating an image of an oil, gas, or water reservoir boundary from well pressure test data values, the image being oriented relative to a well located in a reservoir, comprising:

obtaining reservoir pressure response values from a well pressure test selected from the group consisting of drawdown, build-up, fall-off and pulse tests;

providing geologic features which are known for the reservoir and have a known orientation to the well;

using the pressure response values obtained to calculate data values reflecting the rate of pressure change over time and the radius of investigation;

extracting from the data values obtained in step (b) the response that is due to near-wellbore and matrix effects, to obtain residual values representative of boundary effects;

calculating values from the residual values representative of an angle-of-view of the boundary as a function of time;

subtracting each angle-of-view from a ring, each ring being analogous to the circumference of the corresponding radius of investigation in time, to form a plurality of circumferential arcs;

individually rotating each circumferential arc about the well so that at least one of the end-points of the circumferential arc is substantially coincident with a known geologic feature;

determining values, by analyzing and applying the spatial location of the end-points of the circumferential arcs, indicative of the location and orientation of the boundaries of the reservoir and using said values to form visual images showing the reservoir boundaries relative to the location of the well.

In another aspect, if the circumferential arc intersects more than one geologic feature, then the arc is divided at each intersection with a boundary-forming geologic feature to form a new shorter arc having a new end-point where the arc was divided, that new shorter arc being rotated about the well so that its new end-point is substantially coincident with the next feature and the shorter arc portion is still located within the reservoir.

BRIEF DESCRIPTION OF THE DRAWINGS

FIGS. 4 to 8 illustrate application of the method of the invention as described in Example I.

More specifically:

FIGS. 9 to 13 illustrate application of the method of the invention as described in Example II.

More specifically:

DETAILED DESCRIPTION OF THE PREFERRED EMBODIMENT

A detailed derivation of the angle-of-view and the radius of investigation is provided in the co-pending application and only those portions necessary to develop nomenclature for the improved invention are summarized herein. Reference numerals used are consistent with the co-pending application.

Figure 1:
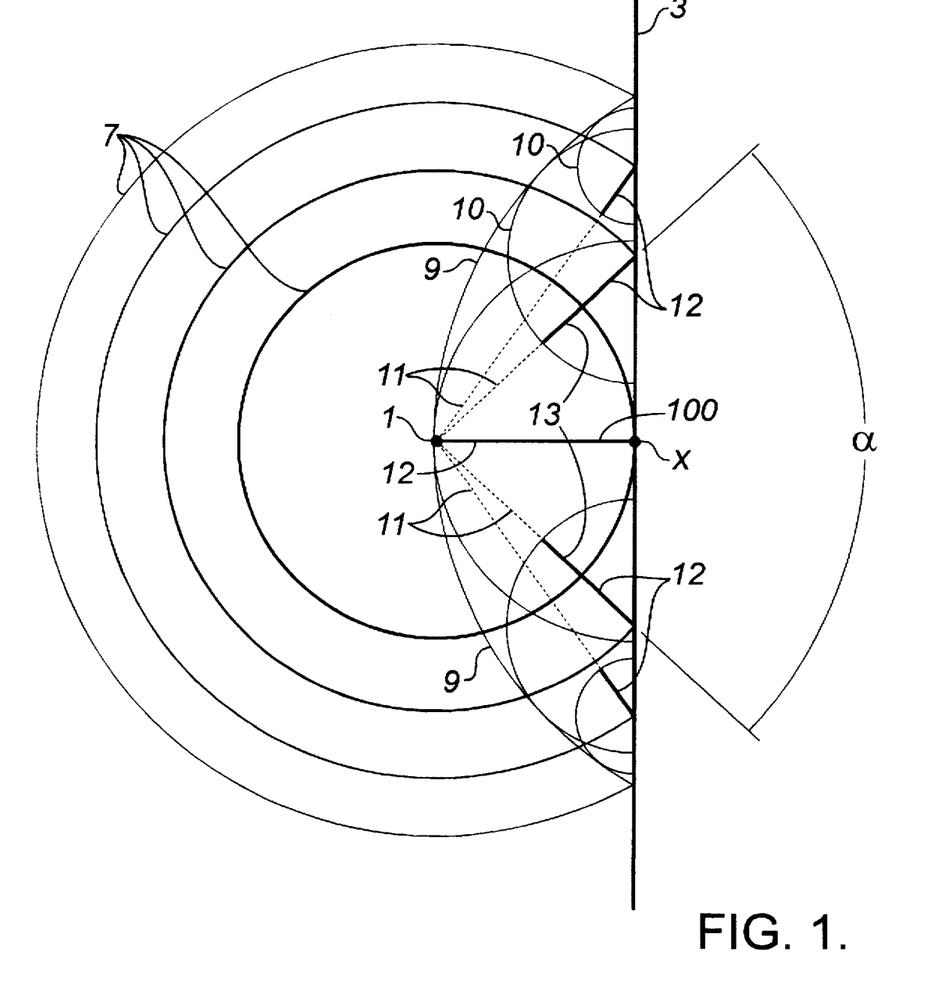
FIG. 1 is a plot of re-emitted wavelets from a boundary contacted by analogous wavefronts emitted from a well.

Having reference to FIG. 1, a series of analogous pressure wavefronts 7 are seen to travel radially outwards from a well 1. The distance that the wavefront 7 extends from the well, at any time, is called the radius of investigation. After a period of time the initial extending wavefront 7 contacts a boundary 3 at its leading edge at point X. At this time, in our concept, the wavefront 7 is absorbed and re-emitted from the boundary 3, creating a returning wavefront 9.

Each individual wavefront 7 travels a smaller radial increment outwards per unit of time than does its predecessor, related to the square root of time. The pressure test data does not provide information about the actual boundary contact until such time as the returning wavefront 9 appears back at the well 1. This time is referred to as the radius of information. The radius of information compensates for the lag in information from the pressure test data and is determined to be ½ of the radius of investigation.

The radius of investigation, and therefore the radius of information, is a function of the specific reservoir parameters and the total time of the well pressure test.

As the extending wavefront 7 continues to impact and widen on the boundary 3, multiple sub-wavefronts or wavelets 10, representing the boundary interactions, are generated. Each wavelet 10 is a circular arc circumscribed within the initial returning wavefront 9. Each later wavelet 10 is smaller than the preceding wavelet and lags slightly as they were generated in sequence after the initial contact.

Vectors 11 are drawn from the center of each wavelet 10 to the well 1. Rays 12 are traced along each vector 11, from the center of each wavelet 10 to its circumference. A ray length 12 which is less than that of the vector 11 indicates that information about the boundary 3 has not yet been received at the well 1. A contact vector 100 extends between the well 1 and the point of contact X.

The length of each vector 11 provides information about the distance from the well 1 to the boundary 3. A ray 12 drawn in the initial returning wavefront 9 is equal to the length of the contact vector 100 and the distance to the boundary 3. When each ray 12 in turn reaches the well 1, as defined by the pressure test elapsed time, its length is equal to the radius of information. Reservoir parameters, and pressure and time data acquired during the transient pressure test are used to calculate the radius of information for each data pair.

The orientation of each vector 11 indicates in which direction the boundary lies. The included angle between a pair of rays 13, formed from the two vectors 11 which are generated simultaneously when the wavefront 7 contacts the boundary 3, is defined as an angle-of-view $\alpha$. As the wavefront 7 progressively widens on an ever greater portion of the boundary 3, the angle-of-view $\alpha$ for the ray pair 13 increases.

In order to relate the angle-of-view to actual reservoir characteristics, the timing and spacing of the discretized wavefronts 7 is obtained from the directly measured pressure response data from the well 1 and is portrayed in a Bourdet Response Curve. Relationships of the angle-of-view and the pressure response curve are determined as a function of the ratio of the actual Bourdet Response Curve $BR_{actual}$ and the ideal Bourdet Response Curve for an infinite reservoir $BR\infty$. Near wellbore and matrix behaviour was normalized out. Knowledge of the $BR\infty$ using conventional methods and the $BR_{actual}$ from well test pressure data enables calculation of the angle-of-view.

The orientation of the angle-of-view is indeterminate and several models are employed to assume the orientation of the boundary: the Angular Image model; the Balanced Image model; or the Channel-Form Image model. The models assists in orienting the boundary with respect to the contact vector. Each model results in the determination of a different image of the reservoir boundaries. Only one image is chosen as being the most representative of the geologic features of the reservoir.

Figure 2:
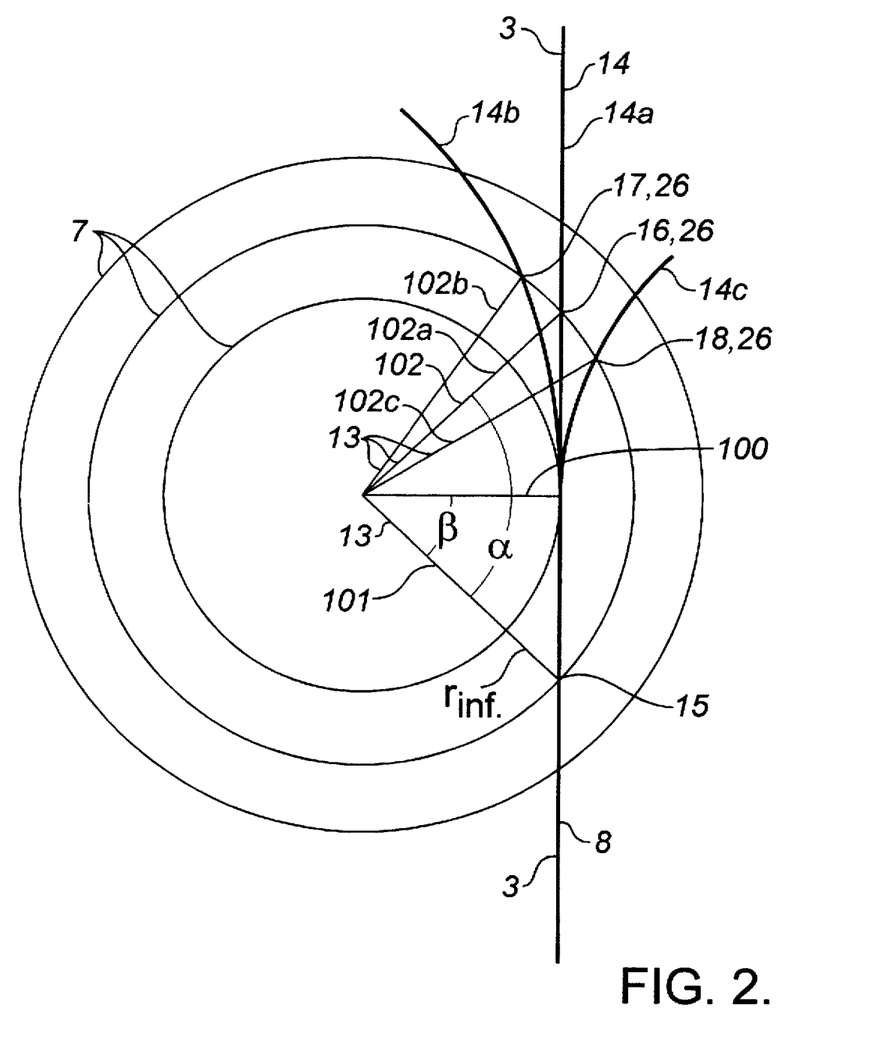
FIG. 2 demonstrates the determination of boundary coordinates according to an Angular Model.

In illustration and having reference to FIG. 2, an Angular Image model is reproduced from the co-pending application. The extending wavefront 7 is shown contacting a boundary 3 formed of an assumed flat boundary portion 8 extending in one direction and the remaining boundary portion 14 extending in the opposite direction in one of either a flat 14a, concave curved 14b, or a convex curved 14c orientation. The exact orientation of boundary portion 14 is determined by applying the angle-of-view principle as referenced to the assumed geometry of boundary portion 8. Vector 101 is determined geometrically by determining the intersection 15 of the radius of information with the flat boundary 8 for each ray pair 13. The intersection 15 is one coordinate of the boundary for that radius of information.

An angle beta $\beta$ is defined, calculated in terms of the arc-cosine of the contact distance and the radius of information, which orients the intersecting vector 101 relative to the contact vector 100.

An angle-of-view $\alpha$ is determined from the pressure response data.

Vector 102, returning from a boundary interaction, is then located by rotating it an angle-of-view $\alpha$ relative to the intersecting vector 101 along an arc drawn at the radius of information from the well 1. Vector 102 may manifest in one of three forms 102a,b,c dependent on the orientation of the boundary. Clearly, if the angle-of-view α is greater than 2×β, then vector 102b is seen to contact a concave boundary 14b at a boundary coordinate 17. Conversely, if α is less than 2×β, then the vector 102c is seen to contact a convex boundary 14c at a coordinate 18. Finally, if the angle-of-view α is equal to twice the β angle then vector 102a contacts a flat boundary 14, intersecting at coordinate 16. The contact 16,17 or 18 of vector 102 defines a second coordinate 26 on the boundary at that particular radius of information.

Figure 3:
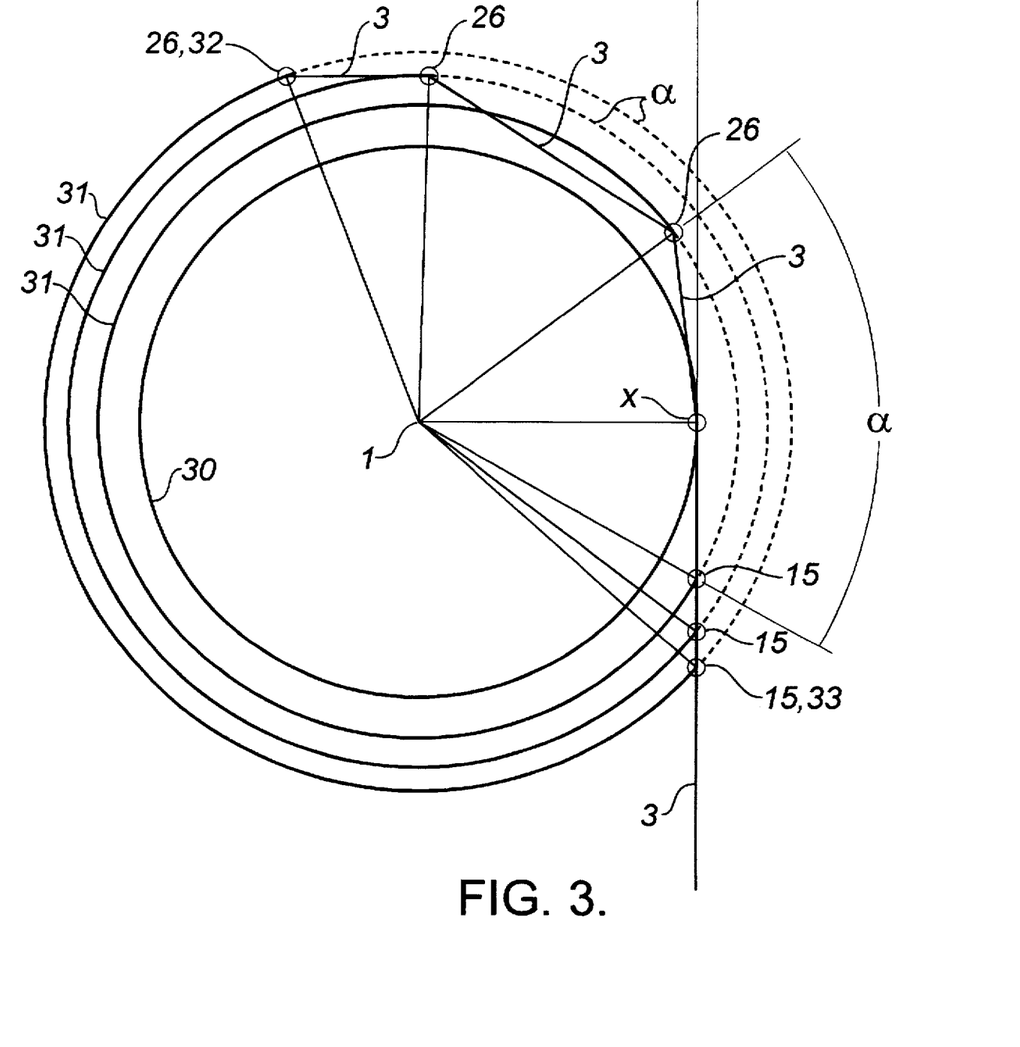
FIG. 3 illustrates the angle-of-view and their end-points for four radii of investigation.

Having reference to FIG. 3, pairs of coordinates 15,26 are determined for each successive radius of information, eventually developing enough pairs of coordinates to form an image of the boundary of the reservoir.

Thus far, this determination of the angle-of-view and the coordinates of the orientation of the boundary, is as it was disclosed in the co-pending application. The above derivation has clearly identified that at a particular radius of information, when a boundary is encountered, it may be defined as having a length, in polar coordinates, equivalent to the angle-of-view α. What the above does not provide, nor does the well pressure data provide, is the information necessary to orient the boundary. The method thus requires the adoption of one of several simplifying assumptions which relates the boundary information at one radius of information to the boundary information for the immediately previous radius of information.

The present invention instead treats the boundary information, specifically the angle-of-view, calculated at each radius of information, as being individuals, distinct from the others.

Referring again to FIG. 3, the circumference of each radius of information can be represented as being analogous to a ring 30. Reservoir encompassed within the ring 30 is deemed to be in communication with the well 1. The circumference of this ring 30 is interrupted only by the presence of a boundary 3, the interruption having a circumferential length equivalent to the angle-of-view. Clearly, by definition, the reservoir beyond the angle-of-view, or boundary, is not in communication with the well. In our view, the angle-of-view represents the sum of any and all boundary effects experienced by the analogous wavefront at that radius of information. The boundary encountered may be either a contiguous boundary, or two or more discontinuous, albeit smaller boundaries.

The ring 30 is therefore comprised of a circumferential or ring arc 31, located in the reservoir, and an angle-of-view α, being an arc located along a boundary. The angle-of-view α may include one or more arcs $\alpha_1$, $\alpha_2$, etc., representing multiple interactions of the radius of information with a boundary or boundaries. Correspondingly, the ring arcs 31 may include one or more arcs residing between these successive interactions with the boundaries.

Ring arcs 31 exist for each radius of information and are independent from each other. More particularly, each ring arc may be individually fitted to known geologic features or boundaries.

The fitting process commences by examining successively larger radii of information until a boundary contact X is located. This is indicated when the angle-of-view α first has a value greater than zero. Accordingly, a 360 degree ring becomes discontinuous to the extent of the angle-of-view and forms a ring arc. Initially the ring arc 31 has only two end-points 32, 33, located at each end of the angle-of-view α.

The ring arc is rotated so as to cause one end-point to coincide with a known geologic feature or boundary (not shown). The circumference of the ring arc is examined to determine if any additional geologic features are intersected. If not, then the fitting process moves onto the next successive and larger radius of information. When the rings arcs for all the radii of information have been fitted, their collective end-points describe the boundary.

The present invention is most conveniently described through the presentation of the following examples.

EXAMPLE I

Figure 4:
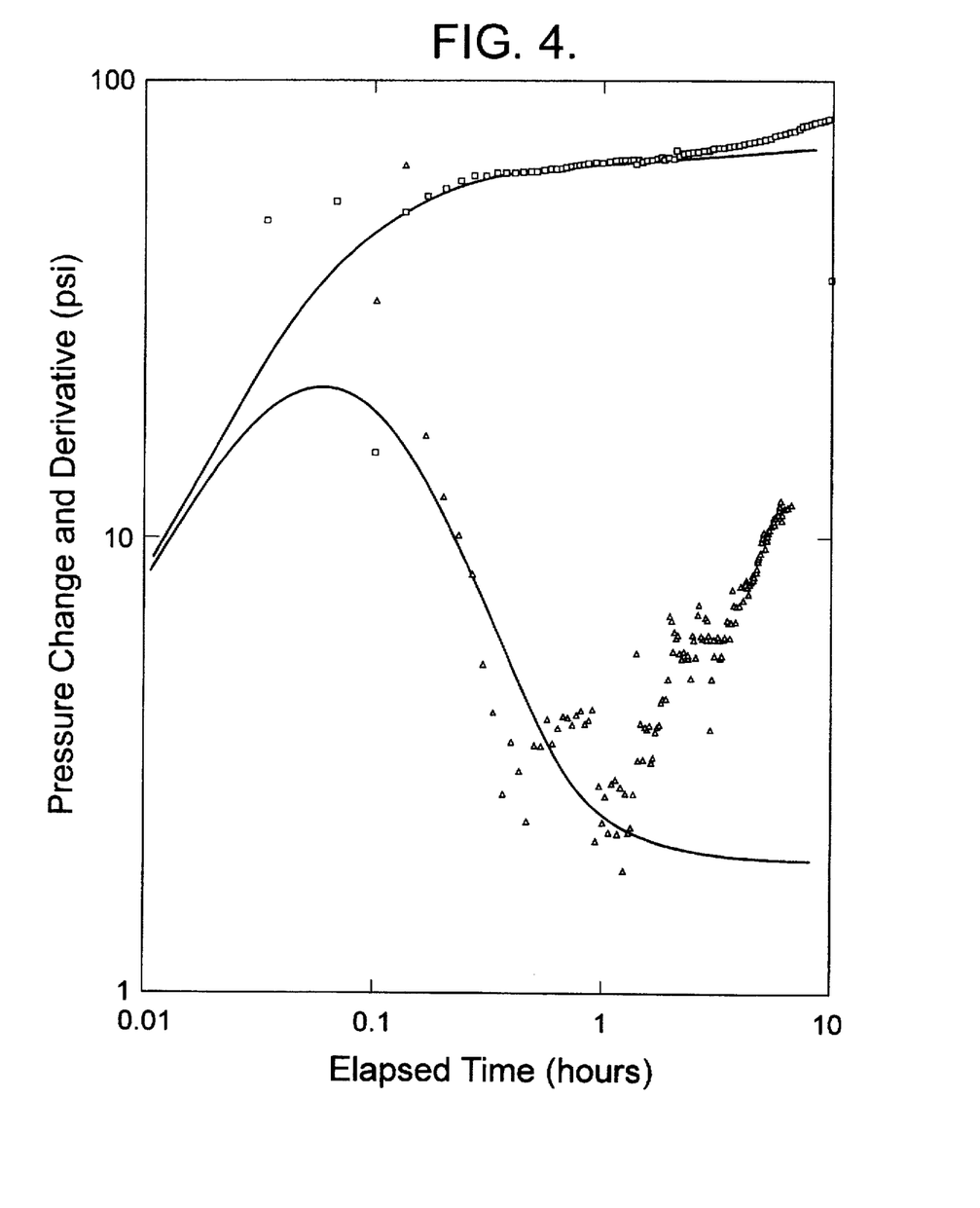
FIG. 4 is a typical Bourdet Type Curve for the well test data of Example I.
Figure 5:
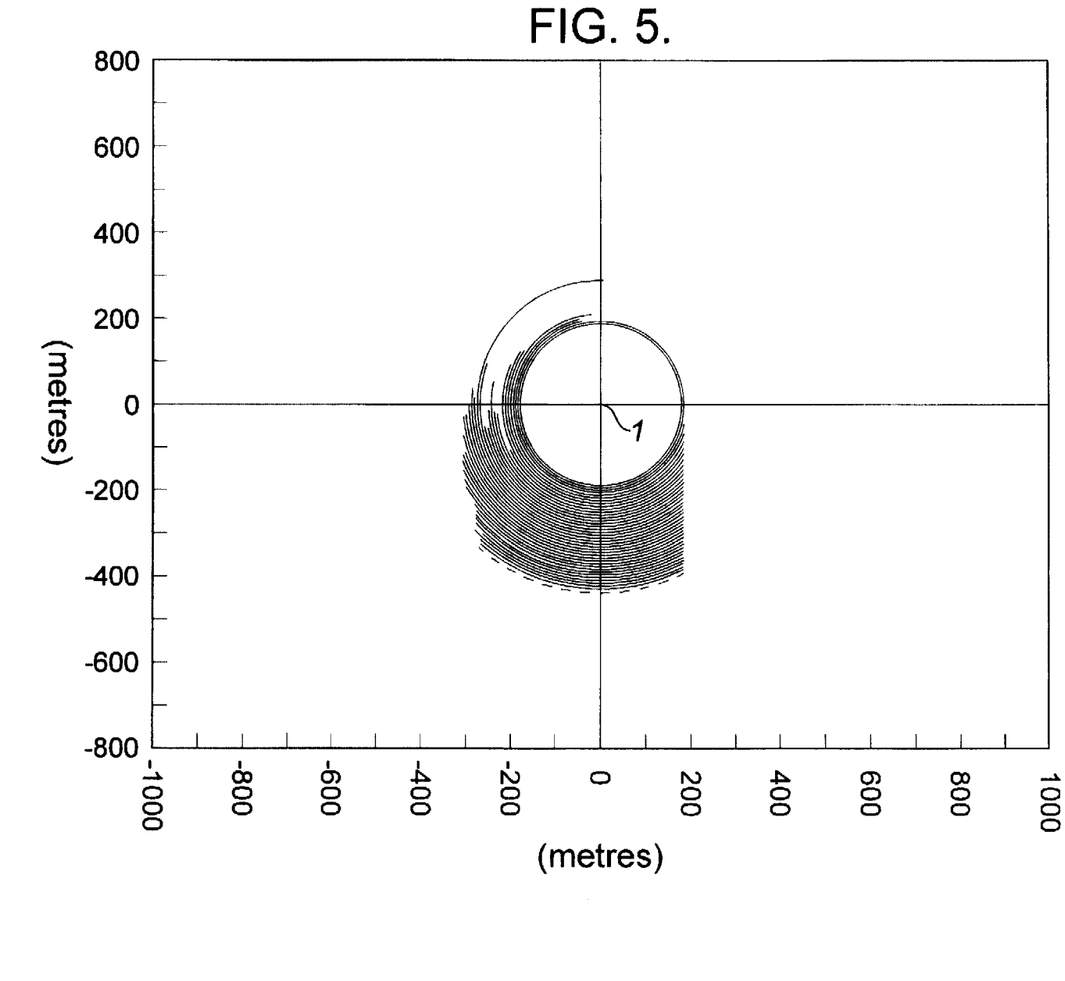
FIG. 5 presents the calculated boundary image results as determined by application of Angular Image model to the data according to FIG. 4.
Figure 6:
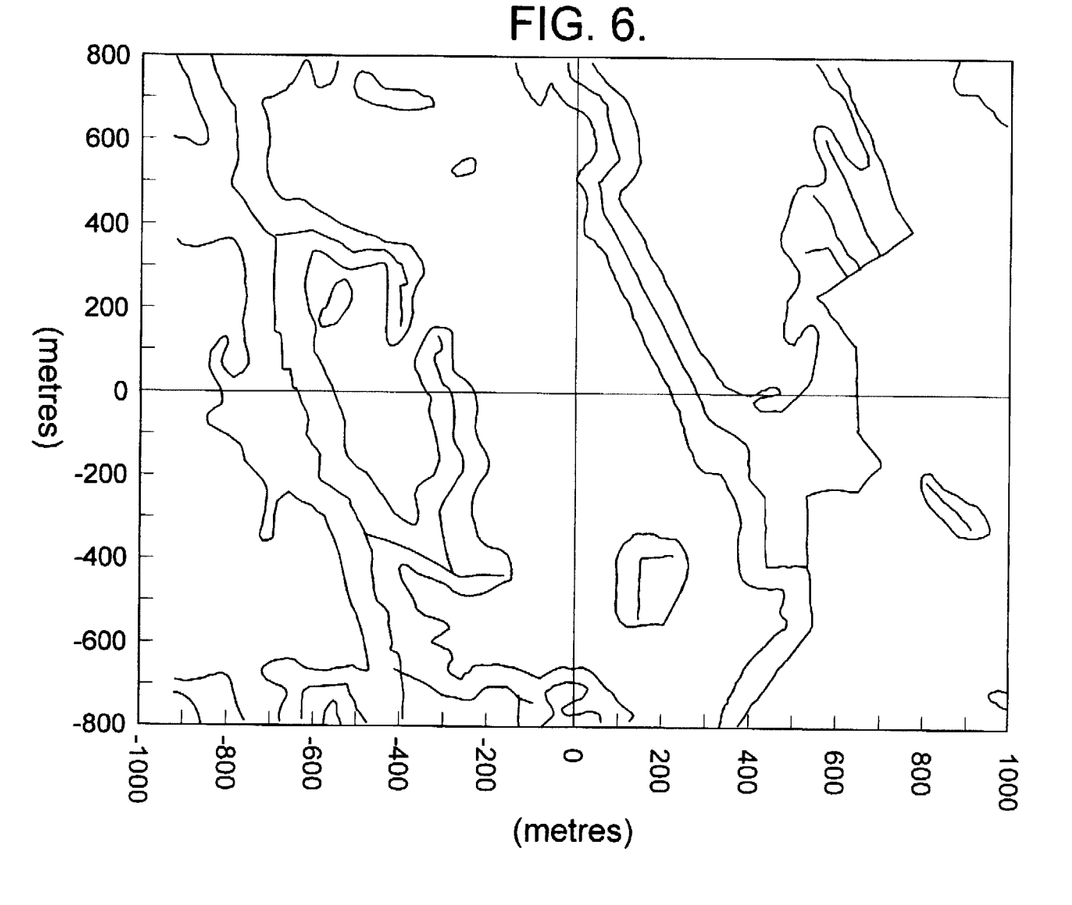
FIG. 6 is an areal view of known geologic features for the well and reservoir of FIG. 4.

Having reference to FIG. 4, a Bourdet Response Curve is shown for a well. Applying an Angular Image model and the techniques disclosed in the co-pending application, a theoretical or diagnostic image was conveniently formed, as shown in FIG. 5, as a series of rings. Those rings having their full circumference intact indicated that no boundary had yet been reached at that radius of information. Discontinuous rings, or ring arcs, indicate that the reservoir, somewhere along that radius of information, was interrupted by a boundary or boundaries. Referring to FIG. 6, geologic lineament data was available for assisting in grossly defining the geologic features of the reservoir.

Figure 7:
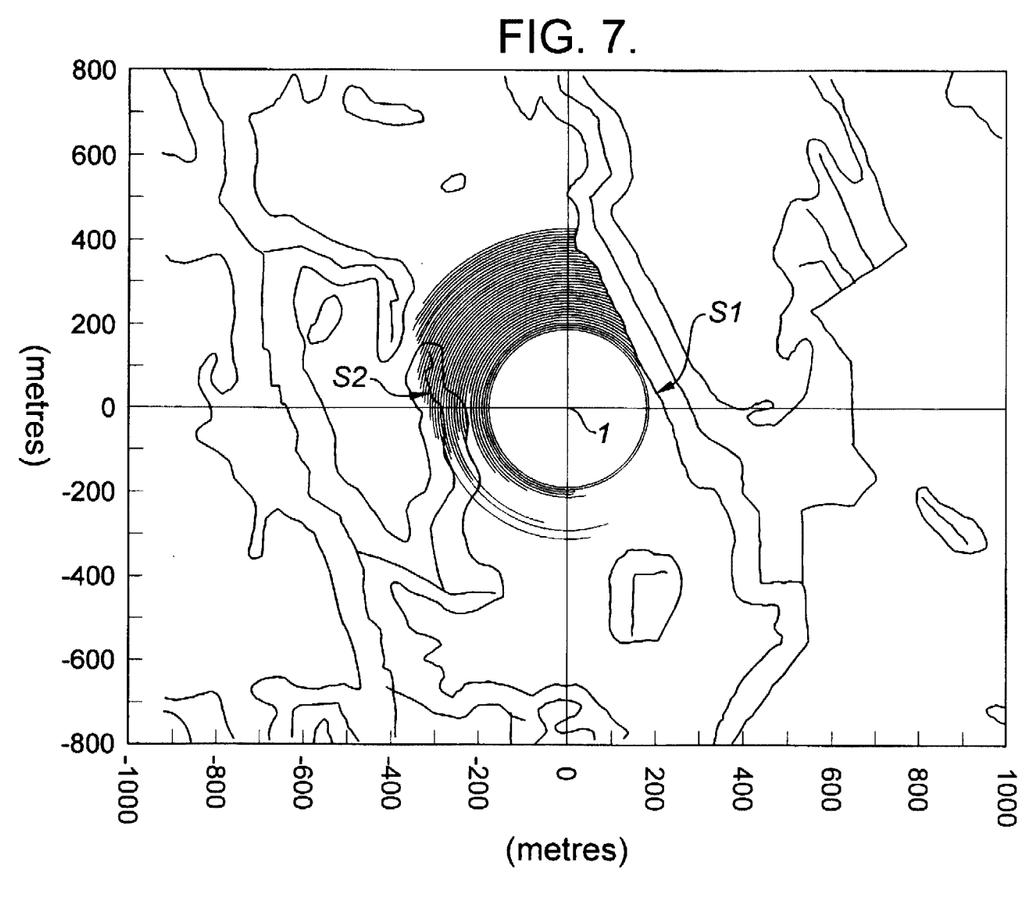
FIG. 7 shows the improved results of matching each angle-of-view for the boundary image according to FIG. 5 to the geologic features of FIG. 6.

Referring to FIG. 7, the diagnostic image was roughly positioned to fit over the known geologic features. Starting at the innermost ring arc, the closest geologic feature was identified as S1. The ring arc was rotated so as to overlay one end-point of the ring as close to that feature S1 as possible. The selected end-point of the ring arc didn't quite contact the feature S1, indicating that the characteristics of the "known" feature were not accurately understood. Successive ring arcs were similarly rotated, one end-point of each ring arc being successfully positioned to lay on the geologic feature S1.

Figure 8:
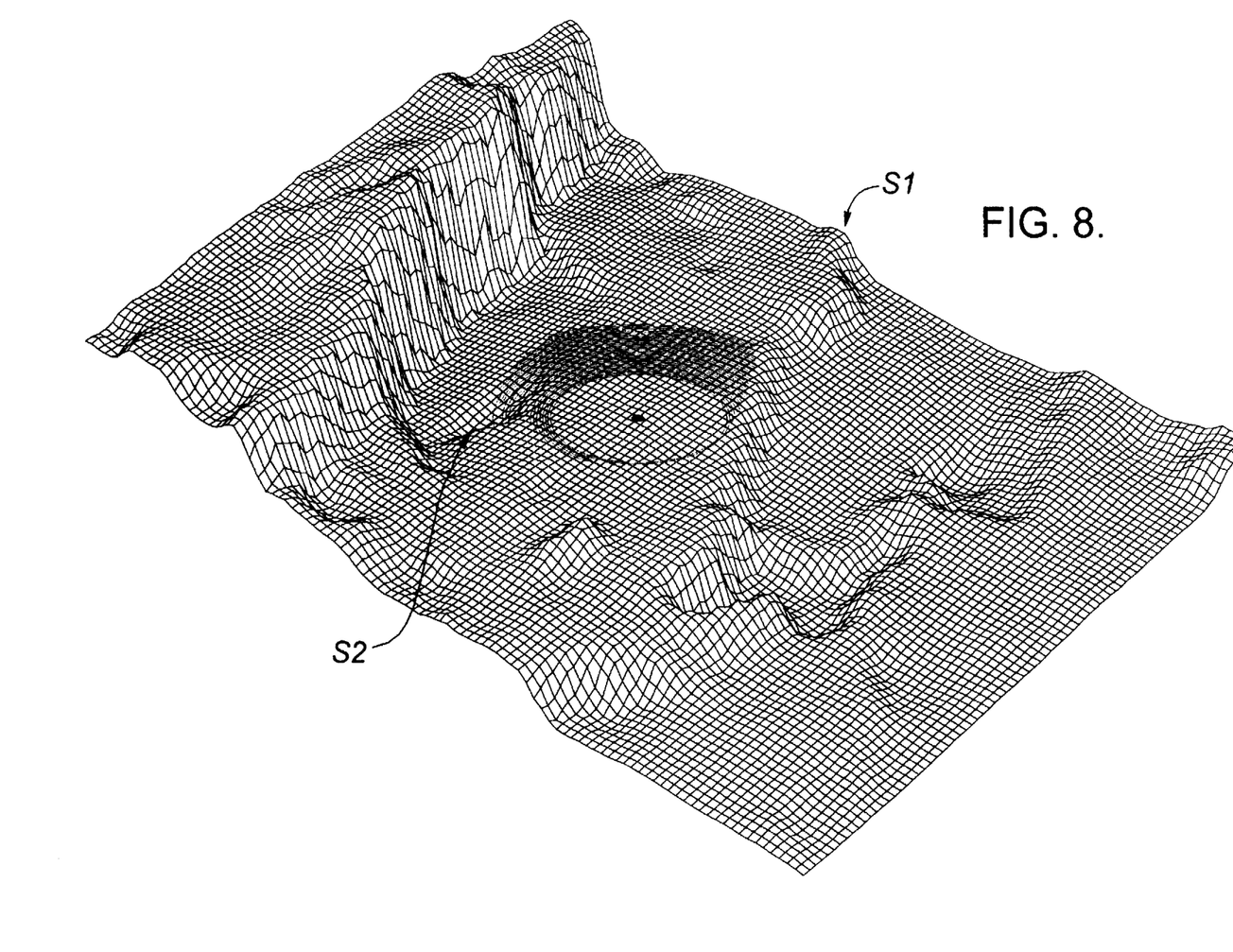
FIG. 8 shows the results of FIG. 7 as superimposed onto the 3-dimensional seismic structure corresponding to the geologic features of FIG. 6.

It may be seen from FIG. 7 and 8 that the opposing end-points of the rotated ring arcs (those end-points which were not purposefully overlaid on a known feature) also tended to correspond with known geologic features. More specifically, these opposing end-points appeared to consistently terminate at the geologic feature S2 on FIG. 7, more clearly recognized as a trough-like feature S2 in FIG. 8.

EXAMPLE II

Example II illustrates the application of the invention where the angle-of-view is a result of multiple discrete boundaries encountered at a radius of information.

Figure 9:
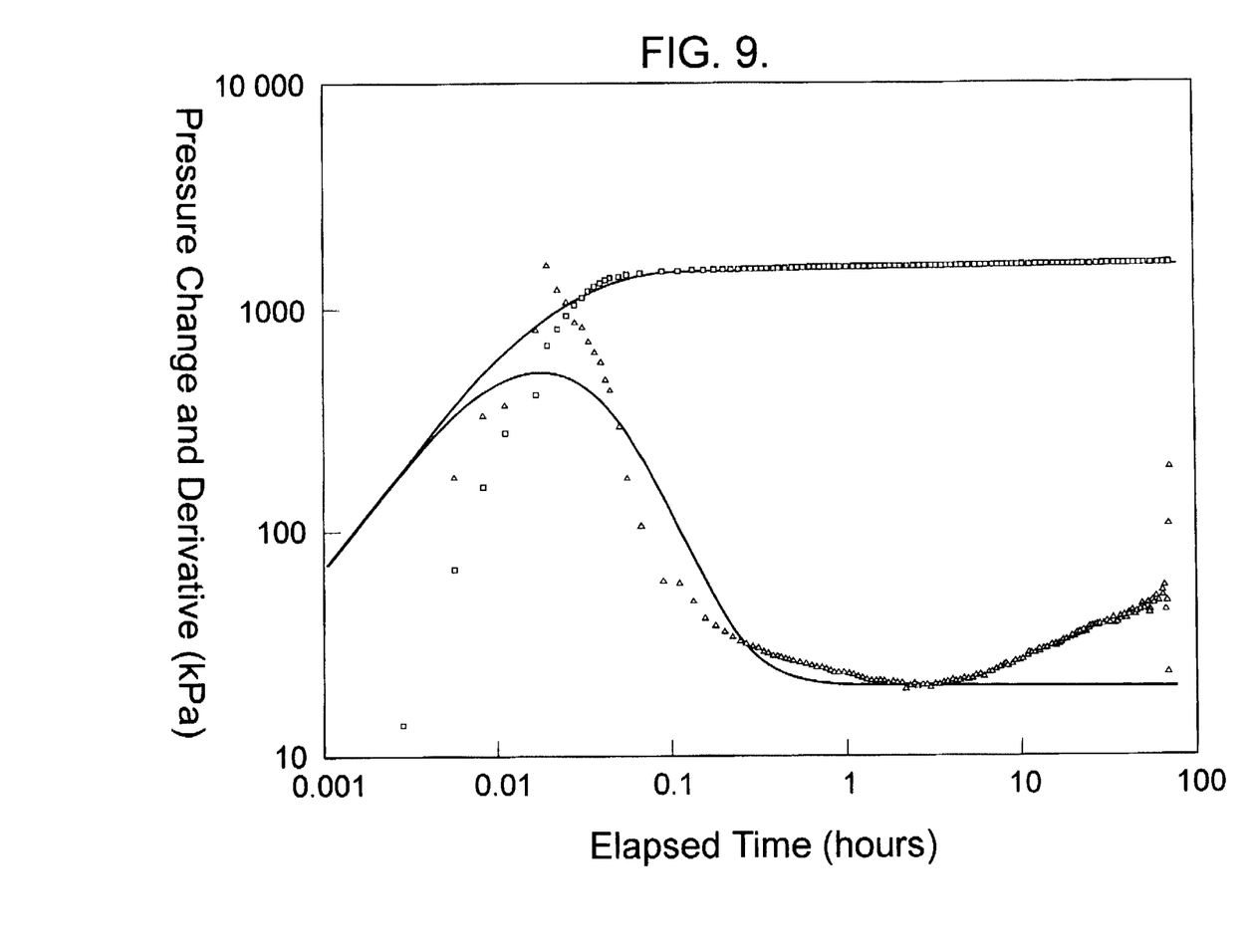
FIG. 9 is a typical Bourdet Type Curve for the well test data of Example II.
Figure 10:
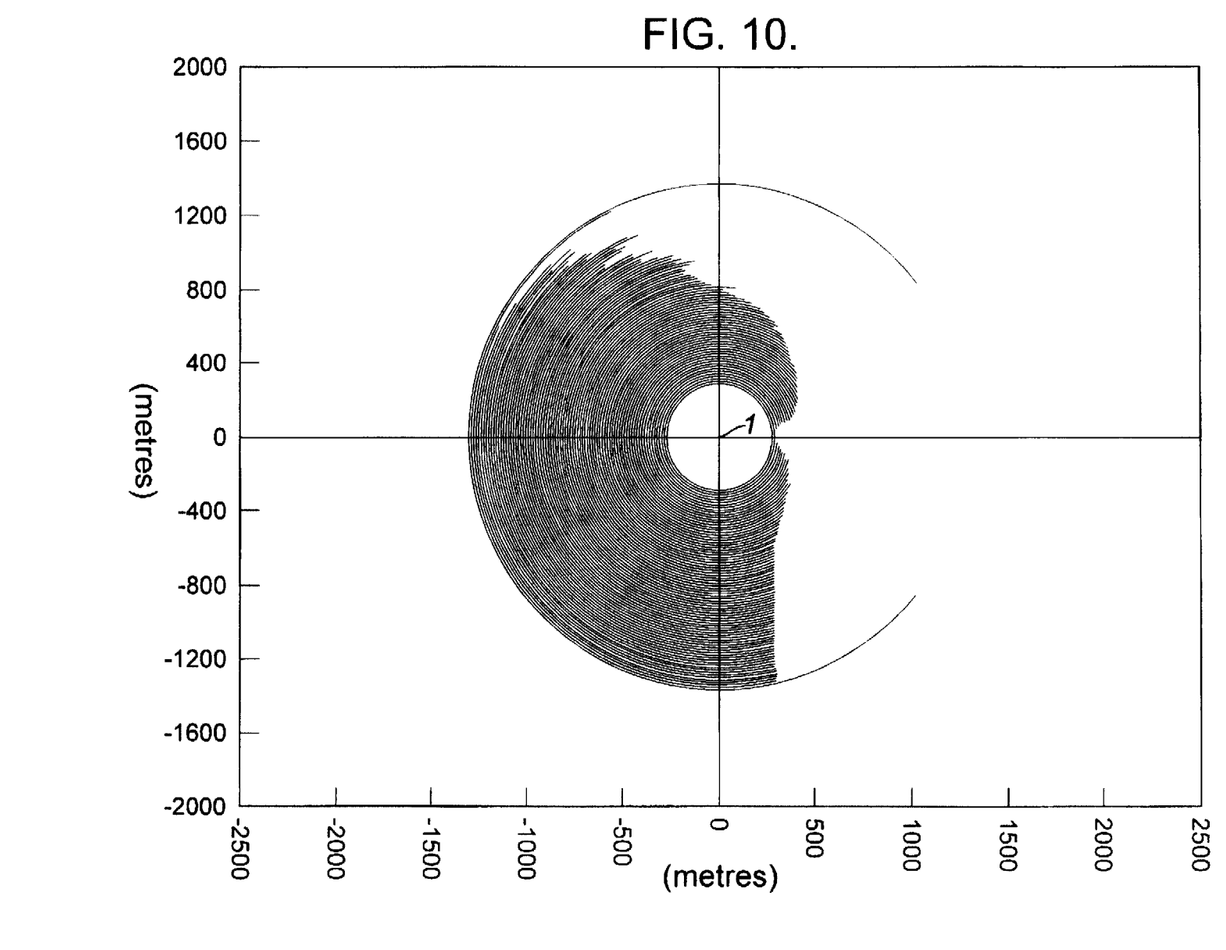
FIG. 10 presents the calculated boundary image results as determined by application of Angular Image model to the data according to FIG. 9.
Figure 11:
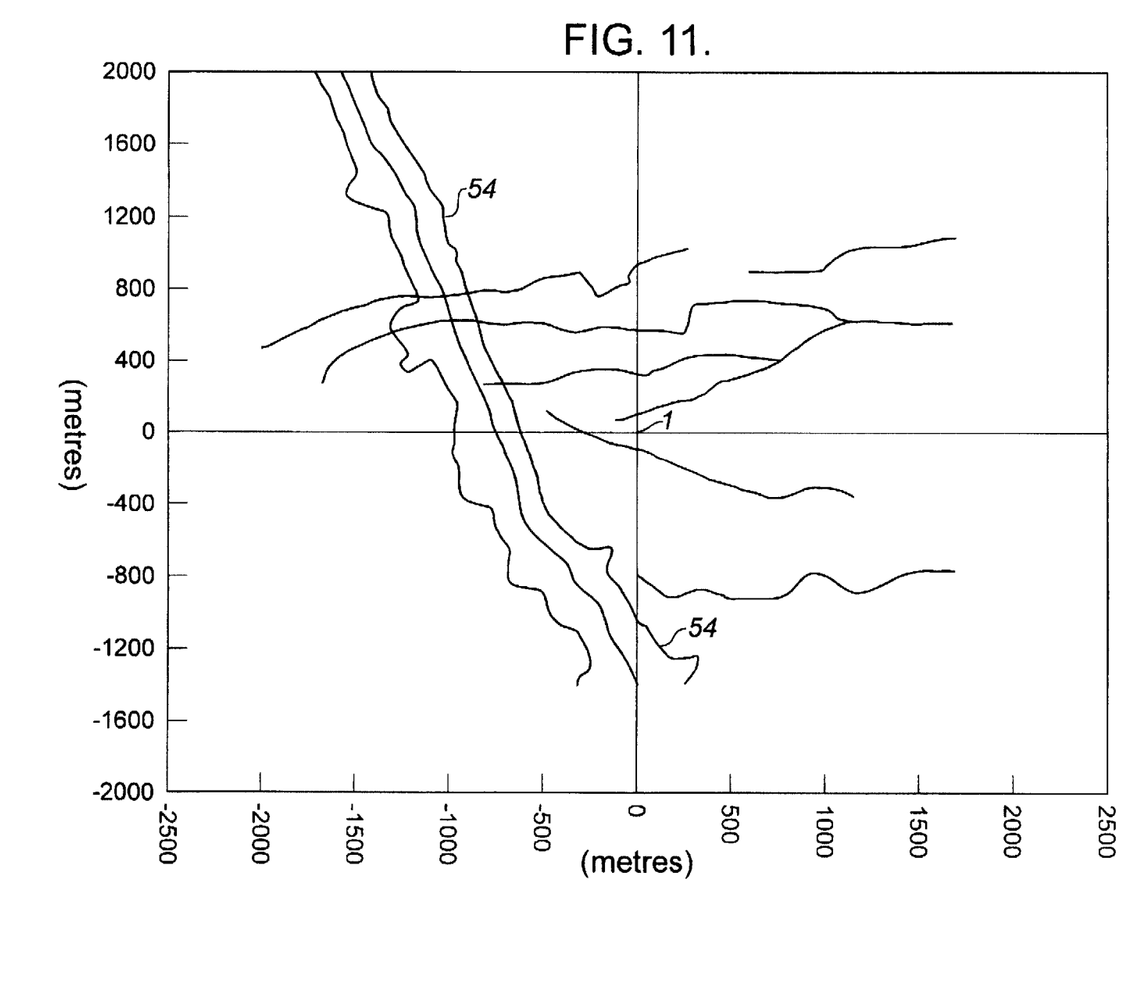
FIG. 11 is an areal view of known geologic features for the well and reservoir of FIG. 9.

Having reference to FIG. 9, a Bourdet Response Curve is shown for a different well than that presented in Example I. Applying an Angular Image model, a convenient diagnostic image was formed, shown in FIG. 10 as a series of ring arcs. A significant amount of geologic lineament data was available for this well, as shown in FIG. 11. Some of the geologic features are more significant than others, such as the major fault line identified as S4 and other less significant features. An experienced analyst can assist greatly in the identification of features of significance and fitting of the ring arc data to detailed geologic features as shown in FIG. 11.

Figure 12:
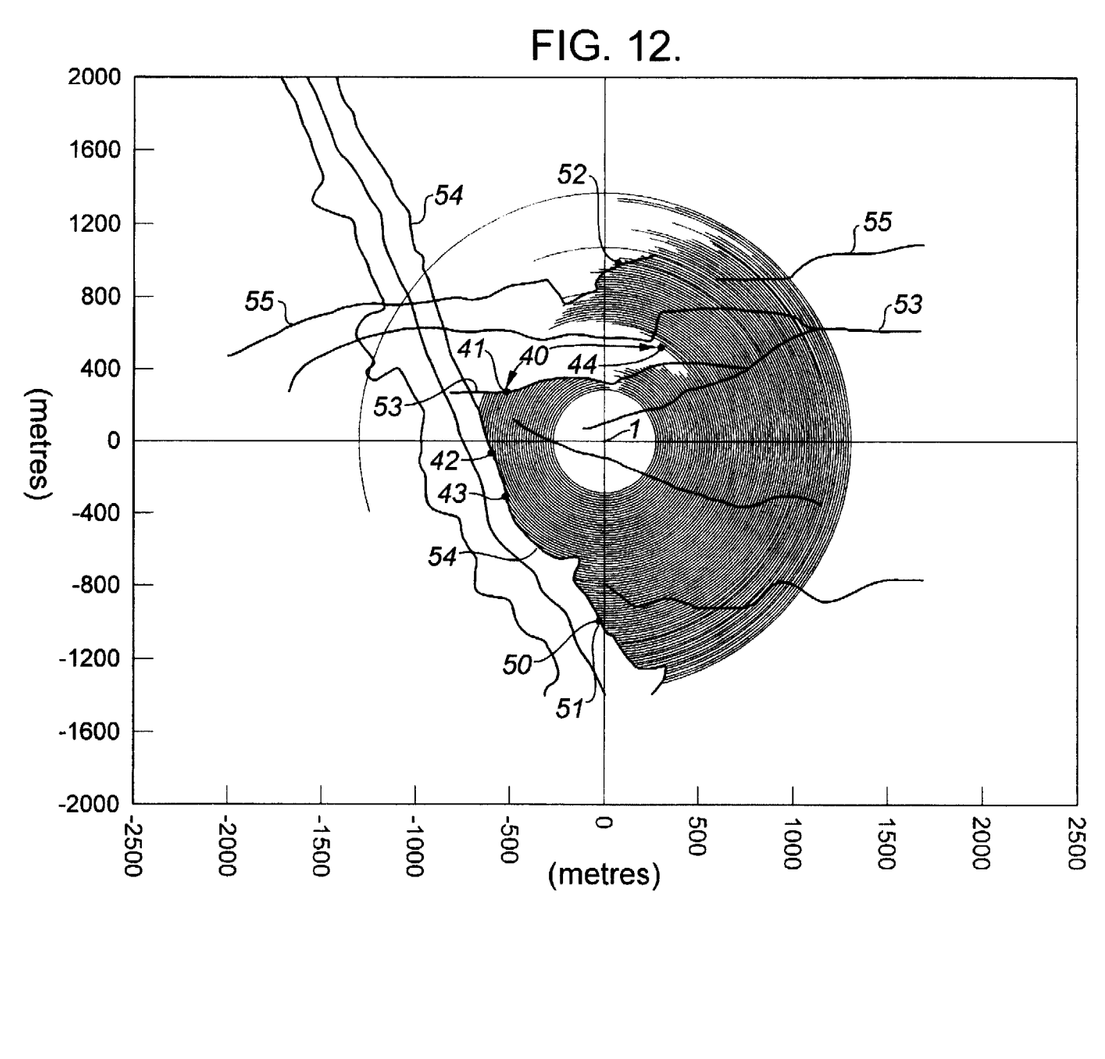
FIG. 12 shows the improved results of matching each angle-of-view for the boundary image according to FIG. 9 to the geologic features of FIG. 11.

Referring to FIG. 12, and starting at the innermost ring arc, the closest seismic feature was identified as S3. The ring arc was rotated so as to overlay one end-point of the ring as close to that feature S3 as possible. Both the selected end-point and the opposing end-point quite closely corresponded to the feature S3. Numerous additional ring arcs were similarly rotated which continued to match the S3 feature.

At a certain radius of information, a ring arc 40 intersected not only S3 but also another significant feature S4. The end-point 41 of ring arc 40 was rotated to coincide with S3. Then, ring arc 40 was cut at the intersection 42 with feature S4. A new end-point was formed at the cut to ring arc 40. The remaining shorter portion of ring arc 40 was again rotated until the cut end-point coincided at intersection 43 on feature S4. The opposing end-point 44 of the shorter ring arc terminated back in the vicinity of feature S3 again. Thus, the angle-of-view at this radius of information 40 was seen to be comprised of two distinct and separated ring arcs 41–42 and 43–44 corresponding to boundaries 40–44 along geologic feature S3 and 42–43 along feature S4.

At a much larger radius of information, ring arc 50 was rotated so that end-point 51 coincided with feature S4. The opposing end 52 was seen to also coincide generally in the vicinity of another geologic feature S5.

Figure 13:
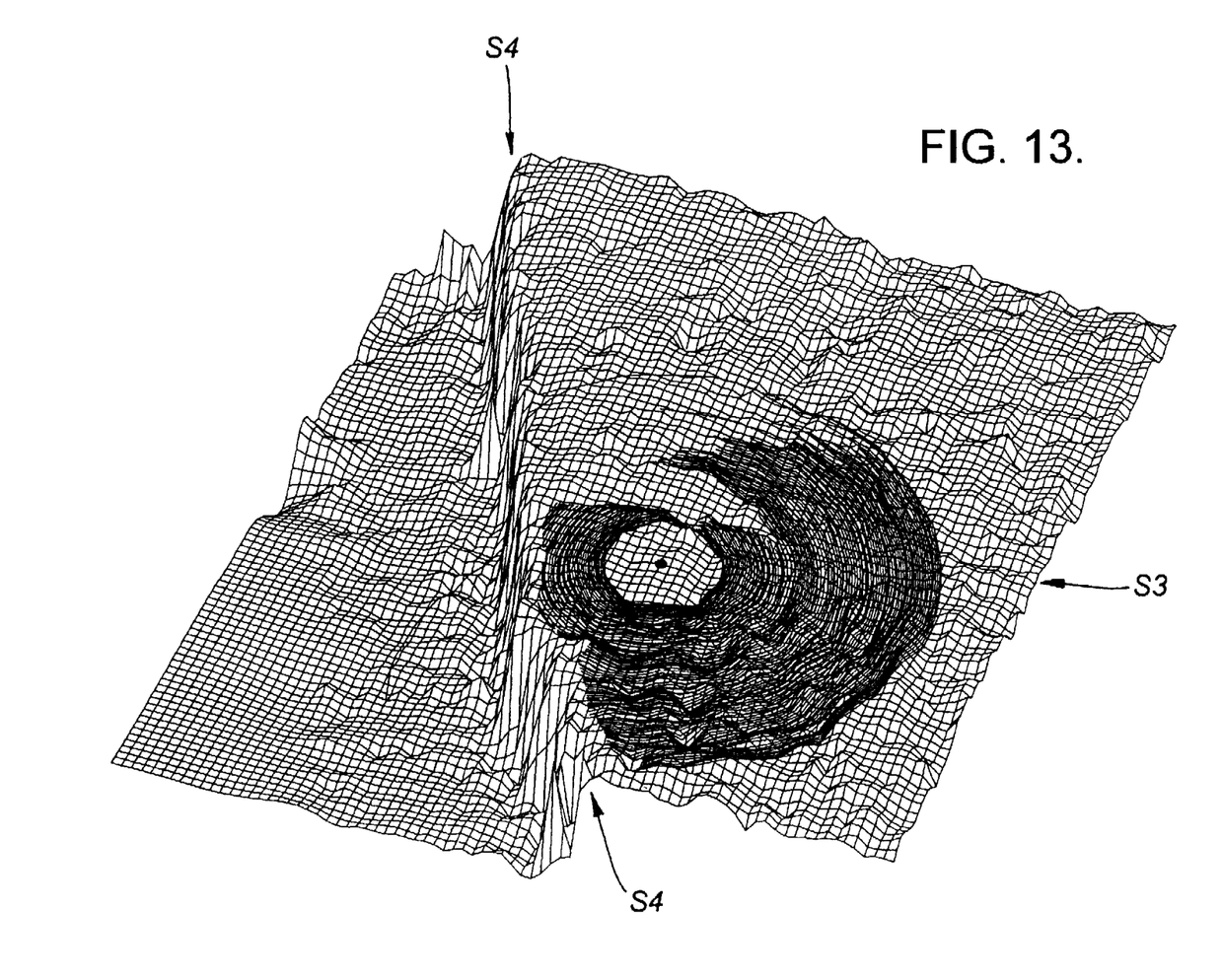
FIG. 13 shows the results of FIG. 12 as superimposed onto the 3-dimensional structure corresponding to the geologic features of FIG. 11.

Having reference to FIG. 13, the rotated ring arcs are depicted on the 3-dimensional representation of the geologic structure, illustrating the superior fit of the angle-of-view information to the reservoir when some basic geologic features are known. This is to be compared with what can be seen to be a rather poor fit, should the diagnostic image of FIG. 10 be superimposed on the geologic lineaments of FIG. 11.

The embodiments of the invention in which an exclusive property or privilege is claimed are defined as follows:

1. A method for creating an image of an oil, gas, or water reservoir boundary from well pressure test data values, the image being oriented relative to a well located in a reservoir, comprising:

(a) obtaining reservoir pressure response values from a well pressure test selected from the group consisting of drawdown, build-up, fall-off and pulse tests;

(b) providing geologic features which are known for the reservoir and have a known orientation to the well;

(c) using the pressure response values obtained to calculate data values reflecting the rate of pressure change over time and the radius of investigation;

(d) extracting from the data values obtained in step (b) the response that is due to near-wellbore and matrix effects, to obtain residual values representative of boundary effects;

(e) calculating values from the residual values representative of an angle-of-view of the boundary as a function of time;

(f) subtracting each angle-of-view from a ring, each ring being analogous to the circumference of the corresponding radius of investigation in time, to form a plurality of circumferential arcs;

(g) individually rotating each circumferential arc about the well so that at least one of the end-points of the circumferential arc is substantially coincident with a known geologic feature;

(h) determining values, by analyzing and applying the spatial location of the collective end-points of the circumferential arcs, indicative of the location and orientation of the boundaries of the reservoir; and (i) forming visual images showing the reservoir boundaries relative to the location of the well, using the values determined in step (h).

2. The method as set forth in claim 1 wherein a circumferential arc intersects more than one boundary-forming geologic feature, further comprising:

dividing the circumferential arc at each intersection to form a new shorter arc having a new end-point where the arc was divided; and rotating the new shorter arc about the well so that its new end-point is substantially coincident with the next feature and the shorter arc portion is still located within the reservoir.

* * * * *